United States Patent [19]

Fujio et al.

[11] 4,169,599

[45] Oct. 2, 1979

[54] TWO-PIECE SOLID GOLF BALLS

[75] Inventors: Ryota Fujio; Motozumi Kitayama, both of Akigawa; Fumio Odaka, Kawagoe; Takashi Nyomura, Kodaira; Shiro Anzai, Higashi-Murayama, all of Japan

[73] Assignee: Bridgestone Tire Company Limited, Tokyo, Japan

[21] Appl. No.: 807,274

[22] Filed: Jun. 16, 1977

[30] Foreign Application Priority Data

Jun. 16, 1976 [JP] Japan ............................ 51-69675

[51] Int. Cl.$^2$ .................... A63B 37/02; A63B 37/12
[52] U.S. Cl. ............................. 273/220; 273/235 R; 260/42.32; 260/42.47; 260/42.53; 260/998.14
[58] Field of Search ............ 260/998.14, 42.32, 42.47, 260/42.53; 273/235 R, 220

[56] References Cited

U.S. PATENT DOCUMENTS

| | | | |
|---|---|---|---|
| 3,454,280 | 7/1969 | Harrison et al. | 273/235 R |
| 3,819,768 | 6/1974 | Molitor | 273/235 R |
| 3,940,146 | 2/1976 | Little | 260/998.14 |
| 3,974,238 | 8/1976 | Schweiker et al. | 260/998.14 |
| 4,056,269 | 11/1977 | Pollitt et al. | 260/42.32 |
| 4,065,537 | 12/1977 | Miller et al. | 260/42.47 |
| 4,068,849 | 1/1978 | Di Salvo et al. | 260/998.14 |

*Primary Examiner*—Allan Lieberman
*Attorney, Agent, or Firm*—Sughrue, Rothwell, Mion, Zinn and Macpeak

[57] ABSTRACT

Two-piece solid golf balls having an improved initial velocity are disclosed. The core is obtained by curing a composition comprising (a) 100 parts by weight of polybutadiene, (b) 9–20 parts by weight of a polyfunctional unsaturated ester, (c) 5–10 parts by weight of methacrylic acid and/or acrylic acid, the total amount of the ingredients (b) and (c) being 15–30 parts by weight and the weight ratio of the ingredient (b)/the ingredient (c) being 55/45–80/20, (d) 20–80 parts by weight of a zinc compound and (e) 0.5–5 parts by weight of an alkyl peroxide. The cover comprises (f) 100 parts by weight of a metal salt of a copolymer of ethylene and unsaturated carboxylic acid, said metal salt having a loss tangent of lower than 0.08, and (g) 1–5 parts by weight of an inorganic filler.

13 Claims, No Drawings

TWO-PIECE SOLID GOLF BALLS

BACKGROUND OF THE INVENTION

(1) Field of the Invention

The present invention relates to two-piece solid golf balls having a particularly improved initial velocity, comprising a solid core, which comprises polybutadiene, a polyfunctional unsaturated ester and an unsaturated carboxylic acid which is enclosed with a cover comprising a specifically limited metal salt of a copolymer of ethylene and unsaturated carboxylic acid.

(2) Description of the Prior Art

The carry of the golf ball is influenced by various factors, such as initial velocity when the ball is struck by a golf club, rotation frequency, driven angle, weight, radius, moment of inertia, shape of dimple and the like. When theoretically other conditions are constant, but the initial velocity of golf ball is higher, the carry thereof is longer. Therefore, it is desirable to increase the initial velocity of golf ball in order to improve its performance.

Solid golf balls were first proposed by J. S. Bartsch, and there have hitherto been proposed a large number of solid golf balls. However, these solid golf balls are inferior to any conventional wound golf ball in carry and other properties, and therefore the development of solid golf balls free from such drawbacks has been demanded. For example, a unitary solid golf ball comprising a polyfunctional unsaturated ester and methacrylic acid is disclosed in Japanese Patent Laid Open Application No. 48,423/74 (corresponding to U.S. patent application Ser. No. 250,147 now U.S. Pat. No. 4,056,269), but the golf ball is still insufficient in initial velocity. Further, a two-piece solid golf ball comprising a solid core, which comprises a polyfunctional unsaturated ester, enclosed with a cover of a metal salt of an ethylene/unsaturated carboxylic acid copolymer, is disclosed in Japanese Patent Application Publication No. 9,257/72, but the golf ball is low in initial velocity and poor in durability and further is too soft to give a good click and feel to a player, that is, the golf ball is not satisfactory for use in tournaments and competitions. It is necessary that golf balls for tournaments be well balanced in performance, such as carry, durability and click and feel, which cannot be expressed quantitatively. However, both of the conventional unitary and two-piece solid golf balls are still insufficient in some of the above described performance factors.

SUMMARY OF THE INVENTION

The present invention provides a two-piece solid golf ball not having the above described drawbacks of conventional solid golf balls.

The feature of the present invention is the provision of a two-piece solid golf ball comprising a solid core and a cover enclosing the core, said core being obtained by curing a composition comprising:

(a) 100 parts by weight of polybutadiene containing at least 40% of cis-1,4 configuration, (b) 9–20 parts by weight of a polyfunctional unsaturated ester, (c) 5–10 parts by weight of methacrylic acid and/or acrylic acid, and the total amount of the ingredients (b) and (c) being 15–30 parts by weight and the weight ratio of the ingredient (b)/the ingredient (c) being within the range of 55/45–80/20, (d) 20–80 parts by weight of a zinc compound, and (e) 0.5–5 parts by weight of an alkyl peroxide, and said cover comprising (f) 100 parts by weight of a metal salt of a copolymer of ethylene and unsaturated carboxylic acid, said metal salt having a loss tangent of lower than 0.08, and (g) 1–5 parts by weight of an inorganic filler.

The inventors have firstly found out that the two-piece solid golf ball comprising a specifically limited core enclosed with a specifically limited cover according to the present invention is better than any conventional solid golf ball in initial velocity and durability, and is excellent in click and feel due to its proper hardness. The golf ball having all of these desirable performance factors or properties possesses the desirable qualities of a conventional wound golf ball, as well as the desirable qualities of a unitary solid golf ball, and is suitable as a ball for use in tournaments.

DESCRIPTION OF THE PREFERRED EMBODIMENTS

The core of the two-piece solid golf ball according to the present invention consists of a small spherical body obtained by integrally molding a homogeneous composition comprising:

(a) 100 parts by weight of polybutadiene, (b) 9–20 parts by weight of a polyfunctional unsaturated ester, (c) 5–10 parts by weight of methacrylic acid and/or acrylic acid, the total amount of the ingredients (b) and (c) being 15–30 parts by weight and the weight ratio of the ingredient (b)/the ingredient (c) being 55/45–80/20, (d) 20–80 parts by weight of a zinc compound, and (e) 0.5–5 parts by weight of an alkyl peroxide.

The polybutadiene as the ingredient (a) includes polybutadienes containing at least 40% of cis-1,4 configuration. Among them, cis-polybutadiene containing at least 90% of cis-1,4 configuration is preferably used.

The polyfunctional unsaturated ester as the ingredient (b) is used as a polymerizable monomer, and includes an acrylic acid ester or methacrylic acid ester of di-, tri- and tetra-hydric alcohols. As a bifunctional unsaturated ester, ethylene glycol dimethacrylate is preferably used. As a trifunctional unsaturated ester trimethylolpropane trimethacrylate is preferably used. As a tetrafunctional unsaturated ester, tetramethylolmethane triacrylate.monomethacrylate is preferably used. Among these, trimethylolpropane trimethacrylate is particularly preferably used. The polyfunctional unsaturated ester is used in an amount of 9–20 parts by weight, preferably 11.5–17.5 parts by weight, based on 100 parts by weight of the polybutadiene. When the amount of the polyfunctional unsaturated ester is smaller than 9 parts by weight, the initial velocity of the resulting golf ball is low. While, even when the amount thereof exceeds 20 parts by weight, the initial velocity does not increase a great deal, so the use of an excess amount of the expensive polyfunctional unsaturated ester is not preferred.

The ingredient (c) to be used together with the ingredient (b) is methacrylic acid or acrylic acid or a mixture thereof. Among these, methacrylic acid is preferably used. The ingredient (c) is used in an amount of 5–10 parts by weight, preferably 6–8.5 parts by weight, based on 100 parts by weight of the polybutadiene. When the amount of the ingredient (c) is smaller than 5 parts by weight, the resulting golf ball is too soft and is poor in initial velocity and durability. While, when the amount of the ingredient (c) exceeds 10 parts by weight, the resulting golf ball is too hard and is low in initial velocity.

Further, the total amount of the ingredients (b) and (c) should be 15–30 parts by weight and the weight ratio of the ingredient (b)/the ingredient (c) should be 55/45–80/20, preferably 57/43–75/25, in order to obtain the two-piece solid golf ball having a high initial velocity according to the present invention. When the total amount of the ingredients (b) and (c) or the weight ratio of the ingredient (b)/the ingredient (c) or both of them are outside the above described ranges, the resulting golf ball is low in initial velocity. It is preferable to previously mix the ingredients (b) and (c) and to add the mixture to the ingredient (a).

The ingredient (d), zinc compound, to be added to the core of the two-piece solid golf ball according to the present invention should be a zinc compound, such as zinc oxide, zinc carbonate, zinc hydroxide and the like, which reacts with the ingredient (c) to form crosslinkage by metal ion bonding. These zinc compounds are used alone or in admixture. The ingredient (d) not only acts as a crosslinking agent, but also acts as a filler to increase the weight of the golf ball. The amount of the ingredient (c) to be used in the present invention is smaller than that in any conventional golf ball consisting mainly of polymerizable carboxylic acid. Therefore, the amount of zinc compound required as a crosslinking agent is at most 10 parts by weight based on 100 parts by weight of the ingredient (a). The amount of zinc compound required to adjust the weight of the golf ball varies widely depending upon the kind of zinc compound, the diameter of the solid core, the thickness of the cover, the whole size of the golf ball to be produced, and the like. The weight of the golf ball should be not larger than 45.927 g. In the present invention, golf balls having a weight near to the upper limit of the standard are produced. Based on the above reason, the ingredient (d) is generally used in an amount of 20–80 parts by weight based on 100 parts by weight of the ingredient (a).

When zinc oxide is used as the ingredient (d), active zinc oxide having a fine particle size is preferably used in view of the durability of the resultant ball. Of course, the part, which acts as a weighting agent, of the ingredient (d) may be replaced with other commonly known fillers, such as magnesium oxide, barium sulfate, silica or other metal compounds or mixtures thereof.

The ingredient (e), an alkyl peroxide, is added to the mixture of the ingredients (a), (b), (c) and (d) as a radical initiator in order to cure the mixture. Among alkyl peroxides, dicumyl peroxide is particularly preferably used. It is necessary to use 0.5–5.0 parts by weight, based on 100 parts by weight of the ingredient (a), of an alkyl peroxide in order to give desired hardness and resilience to the resulting golf ball.

In the present invention, when stearic acid is added to the above described compounding ingredients for the solid core, the initial velocity of the resulting golf ball improves. However, the use of an excess amount of stearic acid lowers the hardness of the resulting golf ball, and stearic acid is preferably used in an amount of 0.1–5.0 parts by weight based on 100 parts by weight of the ingredient (a).

A method for preparing the solid core of the golf ball of the present invention will be explained hereinafter, as an example. A homogeneous monomer mixture of (b) a polyfunctional unsaturated ester and (c) methacrylic acid or acrylic acid; (d) a zinc compound and (e) an alkyl peroxide are added simultaneously to (a) polybutadiene, and the resulting mixture is homogeneously mixed and then molded and cured at a temperature range of 120°–180° C., preferably 140°–170° C. in a spherical mold to obtain the solid core.

The cover of the two-piece golf ball according to the present invention comprises (f) 100 parts by weight of a metal salt of a copolymer of ethylene and unsaturated carboxylic acid, said metal salt having a loss tangent of lower than 0.08, and (g) 1–5 parts by weight of an inorganic filler.

The unsaturated carboxylic acid to be used in the ingredient (f) of a metal salt of a copolymer of ethylene and unsaturated carboxylic acid includes, for example, acrylic acid, methacrylic acid, itaconic acid, crotonic acid, sorbic acid and the like. The metal to be used in the metal salt includes sodium, zinc and the like. The ingredient (f) to be used in the present invention is not limited by the proportioned of ethylene to the unsaturated carboxylic acid nor the kind of the metal salt, but it should have a loss tangent of lower than 0.08.

The metal salt of a copolymer of ethylene and unsaturated carboxylic acid includes, for example, Surlyn sold by E. I. Du Pont de Nemours & Co. Inc., U.S.A. However, there are various kinds of Surlyns having different properties. The inventors have measured the loss tangent of 12 kinds of Surlyns at 27° C. and at 100 Hz and found out that, only when 4 kinds of Surlyns having a loss tangent of lower than 0.08 are used in the ingredient (f) of the cover, golf balls having a high initial velocity can be obtained. A sample for the measurement of the loss tangent was produced in the following manner. Surlyn was preheated at 160° C. for 5 minutes, then molded at 160° C. for 5 minutes under a pressure of 100 kg/cm$^2$. The molded sheet was cooled to room temperature in 5 minutes, and then a strip-shaped sample of 5 mm×2 mm×40 mm was cut out from the molded sheet. The loss tangent was measured by means of a high power viscoelastic spectrometer made by Iwamoto Seisakusho. The loss tangent is an indicator for conservation of energy. The lower the loss tangent, the smaller the energy loss.

The cover contains generally 1–5 parts by weight of an inorganic filler (g) to provide a white appearance to the ball. The inorganic filler (g) includes silica, zinc oxide, titanium dioxide and the like.

The above described core is fixed with a cover in the following manner. The above described spherical solid core is wrapped with two hollow semi-spherical shells preformed from cover stock, and the resulting assembly was press-molded at 100°–180° C. in a mold. In this case, it is necessary to use an auxiliary means for fixing the two half shells to the core. One of the means is to make a rough surface on the core by any process such as sand blasting. Another means is to use an adhesive. In addition to the above described means the core can be enclosed in a cover by injection molding.

The following examples are given for the purpose of illustration of this invention and are not intended as limitations thereof. In the examples, parts mean parts by weight.

The initial velocity of the golf ball was measured by means of a golf ball driving machine made by True Temper Corp., wherein a golf ball is struck by a wood No. 1 club at a head speed of about 45 m/sec. This test condition is probably almost the maximum club head speed when an average player strikes a golf ball with a wood No. 1 club. The initial velocity of the golf ball is generally apt to be influenced by the temperature of the ball and other external factors. Accordingly, samples to be compared were measured on the same day.

Durability of the golf ball was estimated in the following manner. A weight of 3 kg is subjected to repeated free falling from the height of 1.5 m to give repeated impact to a ball until cracks occur on the ball surface, and the durability of the ball is estimated by the number of repeated impacts.

EXAMPLES 1 AND 2, AND COMPARATIVE EXAMPLES 1-3

A composition having a compounding recipe shown in the following Table 1 was press molded at 150° C. for 40 minutes in a mold to obtain a solid core having a diameter of 37.1 mm. The core was enclosed in two shells of 2.3-2.5 mm thickness having a compounding recipe shown in Table 1, and the resulting assembly was melted and molded in a mold having a diameter of 41.6 mm to obtain a two-piece solid golf ball. The hardness, initial velocity and durability of the ball are shown in Table 1.

In Examples 1 and 2, 12.5 parts of a polyfunctional unsaturated ester and 7.5 parts of methacrylic acid were used. While, in Comparative Examples 1-3, although the total amount of the polyfunctional unsaturated ester and methacrylic acid is the same 20 parts as that in Examples 1 and 2, both of the amounts of the polyfunctional unsaturated ester and methacrylic acid are outside the scope of the present invention.

It can be seen from Table 1 that the golf ball of the present invention is a highly durable well-balanced golf ball having a high initial velocity and a proper hardness. On the contrary, when the amount of methacrylic acid in the core is too large as described in Comparative Example 1, the resulting ball is too hard and is low in initial velocity. When a core which does not contain polyfunctional unsaturated ester, ingredient (b), as shown in Comparative Example 3 is used, the resulting ball is low in initial velocity and is too hard. Reversely, when a core which does not contain the methacrylic acid, the ingredient (c), as shown in Comparative Example 2, is used, the resulting ball is poor in durability, low in initial velocity and too soft.

It has been generally known that, when the initial velocity of a ball increases by 1 m/sec, the flying distance of the ball increases by at least 4 m. The initial velocity of commercially available unitary solid golf balls for tournaments was lower by about 1 m/sec than that of commercially available wound golf ball when they were measured under substantially the same condition as that used in Examples 1 and 2, except that the temperature of the ball was 20° C. Therefore, the ball of the present invention has fairly high initial velocity.

Table 1

|  |  |  | Example 1 | Example 2 | Comparative Example 1 | Comparative Example 2 | Comparative Example 3 |
|---|---|---|---|---|---|---|---|
| Compounding recipe for core | Cis-polybutadiene* | (parts) | 100 | 100 | 100 | 100 | 100 |
|  | Trimethylolpropane trimethacrylate | (parts) | 12.5 | — | 8 | 20 | — |
|  | Tetramethylolmethane triacrylate · monomethacrylate | (parts) | — | 12.5 | — | — | — |
|  | Methacrylic acid (MAA) | (parts) | 7.5 | 7.5 | 12 | — | 20 |
|  | Polyfunctional unsaturated ester/MAA | (weight ratio) | 62.5/37.5 | 62.5/37.5 | 40/60 | 100/0 | 0/100 |
|  | Activated zinc oxide | (parts) | 65 | 65 | 65 | 65 | 65 |
|  | Dicumyl peroxide | (parts) | 1.8 | 1.8 | 1.8 | 1.8 | 1.8 |
| Compounding recipe for cover | Surlyn 1760 (loss tangent 0.0251) | (parts) | 100 | 100 | 100 | 100 | 100 |
|  | Titanium dioxide | (parts) | 3 | 3 | 3 | 3 | 3 |
| Properties of ball | Weight | (g) | 45.1 | 45.4 | 45.4 | 44.9 | 45.9 |
|  | Initial velocity** | (m/sec) | 66.6 | 66.4 | 65.6 | 65.7 | 65.5 |
|  | Hardness |  | proper | proper | too hard | too soft | too hard |
|  | Durability index*** |  | 310 | 320 | — | 100 | — |

*Sold under the trademark BR01 by Japan Synthetic Rubber Co., content of cis-1,4 configuration: 97%.
**Measured day: A, club head speed: 45.4±0.2 m/sec, temperature of ball: 15° C.
***Durability index is the ratio of the durability of a sample ball to that, calculated as 100, of the sample ball in Comparative Example 2.

EXAMPLE 3

A two-piece solid golf ball was produced under the same compounding recipe as described in Example 1, except that the amount of trimethylolpropane trimethacrylate was varied to 15.5 parts.

The obtained results are shown in the following Table 2.

COMPARATIVE EXAMPLES 4 AND 5

Two-piece solid golf balls were produced under the same compounding recipe as described in Example 3, except that the mixing ratio of trimethylolpropane trimethacrylate to methacrylic acid was varied without changing the total amount of the two ingredients.

Properties of the golf balls are shown in the following Table 2.

As seen from the results obtained in Example 3 and Comparative Examples 4 and 5, the golf ball according to the present invention has a high initial velocity and a proper hardness. The golf ball of Comparative Example 4, whose core was produced by the use of a small amount of polyfunctional unsaturated ester, is too hard, and reversely the golf ball of Comparative Example 5, whose core was produced without using methacrylic acid, is too soft. Therefore, both of the balls of Comparative Examples 4 and 5 are not suitable as a golf ball.

Table 2

|  |  | Example 3 | Comparative Example 4 | Comparative Example 5 |
|---|---|---|---|---|
| Cis-polybutadiene | (parts) | 100 | 100 | 100 |

Table 2-continued

| | | | Example 3 | Comparative Example 4 | Comparative Example 5 |
|---|---|---|---|---|---|
| Compounding recipe for core | Trimethylolpropane trimethacrylate (TMPT) | (parts) | 15.5 | 11 | 23 |
| | Methacrylic acid (MAA) | (parts) | 7.5 | 12 | — |
| | TMPT/MAA | (weight ratio) | 67.5/32.5 | 48/52 | 100/0 |
| | Activated zinc oxide | (parts) | 65 | 65 | 65 |
| | Dicumyl peroxide | (parts) | 1.8 | 1.8 | 1.8 |
| | Weight | (g) | 45.5 | 45.7 | 45.3 |
| Properties of ball | Initial velocity* | (m/sec) | 66.6 | 65.2 | 65.9 |
| | Hardness | | proper | too hard | too soft |

*Measuring condition is the same as that in Table 1.

COMPARATIVE EXAMPLE 6

A golf ball was produced by use of a core produced under the same compounding recipe as described in Example 1, except that the amount of trimethylolpropane trimethacrylate was decreased to 2.5 parts.

Properties of the golf ball are shown in the following Table 3. It is clear from Table 3 that the golf ball of this Comparative Example, whose core is produced by the use of a small amount of a polyfunctional unsaturated ester, has a low initial velocity.

Table 3

| | | | Comparative Example 6 |
|---|---|---|---|
| Compounding recipe for core | Cis-polybutadiene | (parts) | 100 |
| | Trimethylolpropane trimethacrylate (TMPT) | (parts) | 2.5 |
| | Methacrylic acid (MAA) | (parts) | 7.5 |
| | TMPT/MAA | (weight ratio) | 25/75 |
| | Activated zinc oxide | (parts) | 65 |
| | Dicumyl peroxide | (parts) | 1.8 |
| | Weight | (g) | 45.3 |
| Properties of ball | Initial velocity* | (m/sec) | 65.6 |
| | Hardness | | too soft |

*Measuring condition is the same as that in Table 1.

EXAMPLES 4–7 AND COMPARATIVE EXAMPLES 7 and 8

Six kinds of solid golf balls were produced. In the balls, the same compounding recipe was used for the core, but metal salts of ethylene/methacrylic acid copolymer, which metal salts are sold under the trademark Surlyn and have different loss tangents, were used a cover. Comparison of the initial velocities of the balls is shown in the following Table 4.

| Compounding recipe for core | |
|---|---|
| Cis-polybutadiene | 100 parts |
| Ethylene glycol dimethacrylate (ED) | 11.5 parts |
| Methacrylic acid (MAA) | 8.5 parts |
| ED/MAA (weight ratio) | 57.5/42.5 |
| Zinc oxide | 65 parts |
| Dicumyl peroxide | 2.0 parts |

| Compounding recipe for cover | |
|---|---|
| Metal salt of ethylene/methacrylic acid copolymer | 100 parts |
| Titanium dioxide | 3 parts |

It can be seen from Table 4 that a golf ball using a Surlyn having a loss tangent of lower than 0.08 in the cover is higher in the initial velocity than a golf ball using a Surlyn having a loss tangent of not lower than 0.08 in the cover.

Table 4

| | Example | | | | Comparative Example | |
|---|---|---|---|---|---|---|
| | 4 | 5 | 6 | 7 | 7 | 8 |
| Kind of copolymer (kind of Surlyn) | 1707 | 1706 | 1560 | 1605 | 1557 | 1601 |
| Kind of metal of metal salt of copolymer | sodium | zinc | sodium | sodium | zinc | sodium |
| Loss tangent | 0.0475 | 0.0521 | 0.0738 | 0.0755 | 0.0808 | 0.0889 |
| Weight (g) | 45.4 | 45.5 | 45.5 | 45.2 | 45.2 | 45.1 |
| Initial velocity* (m/sec) | 64.8 | 65.3 | 65.0 | 65.1 | 63.5 | 63.5 |

*Measured day: B, club head speed: 45.6±0.1 m/sec, temperature of ball: 10° C.

EXAMPLE 8 AND COMPARATIVE EXAMPLE 9

A two-piece solid golf ball and a unitary solid golf ball were produced by the use of the same amounts of a polyfunctional unsaturated ester and methacrylic acid in the core. The cover of the ball in Example 8 is the same as that of Example 1. In Comparative Example 9, active zinc oxide is used in a small amount so that the weight of the resulting golf ball is substantially the same as that of Example 8. The initial velocity of each of the resulting golf balls is shown in the following Table 5.

It can be seen from Table 5 that the two-piece solid golf ball is higher in initial velocity than the unitary solid golf ball, which is substantially the same in compounding recipe and in weight as the two-piece solid golf ball.

Table 5

| | | | Example 8 | Comparative Example 9 |
|---|---|---|---|---|
| Compounding recipe for core | Cis-polybutadiene | (parts) | 100 | 100 |
| | Ethylene glycol dimethacrylate (ED) | (parts) | 11.5 | 11.5 |
| | Methacrylic acid (MAA) | (parts) | 8.5 | 8.5 |
| | ED/MAA | (weight ratio) | 57.5/42.5 | 57.5/42.5 |

Table 5-continued

|  |  |  |  |  |
|---|---|---|---|---|
|  | Activated zinc oxide | (parts) | 65 | 44 |
|  | Dicumyl peroxide | (parts) | 1.8 | 1.8 |
| Structure of ball |  |  | two-piece solid | unitary solid |
| Properties of ball | Weight | (g) | 45.1 | 44.7 |
|  | Diameter | (mm) | 41.15 | 41.15 |
|  | Initial velocity* | (m/sec) | 63.8 | 62.4 |

*Measured day: C, club head speed: 45.5±0.2 m/sec, temperature of ball: 5° C.

EXAMPLES 9-12

Two-piece solid golf balls were produced by the use of solid cores containing different amounts of stearic acid according to the compounding recipes shown in the following Table 6.

The weight and initial velocity of the golf balls are shown in Table 6.

It can be seen from Table 6 that the initial velocity of the solid golf ball is improved by adding stearic acid to the core.

Table 6

|  |  |  | Example | | | |
|---|---|---|---|---|---|---|
|  |  |  | 9 | 10 | 11 | 12 |
| Compounding recipe for core | Cis-polybutadiene | (parts) | 100 | 100 | 100 | 100 |
|  | Trimethylolpropane trimethacrylate (TMPT) | (parts) | 11.5 | 11.5 | 11.5 | 11.5 |
|  | Methacrylic acid (MAA) | (parts) | 8.5 | 8.5 | 8.5 | 8.5 |
|  | TMPT/MAA | (weight ratio) | 57.5/42.5 | 57.5/42.5 | 57.5/42.5 | 57.5/42.5 |
|  | Activated zinc oxide | (parts) | 70 | 70 | 70 | 70 |
|  | Dicumyl peroxide | (parts) | 2.4 | 2.4 | 2.4 | 2.4 |
|  | Stearic acid | (parts) | 0.0 | 1.0 | 3.0 | 5.0 |
| Compounding recipe for cover | Surlyn 1605 (loss tangent 0.0755) | (parts) | 100 | 100 | 100 | 100 |
|  | Titanium dioxide | (parts) | 3.0 | 3.0 | 3.0 | 3.0 |
| Properties of ball | Weight | (g) | 45.0 | 45.0 | 44.8 | 44.7 |
|  | Initial velocity* | (m/sec) | 65.5 | 65.7 | 66.0 | 65.9 |

*Measured day: D, club head speed: 45.5±0.2 m/sec, temperature of ball: 20° C.

Table 7

|  |  |  | Example 13 |
|---|---|---|---|
| Compounding recipe for core | Cis-polybutadiene | (parts) | 100 |
|  | Trimethylolpropane trimethacrylate (TMPT) | (parts) | 11.5 |
|  | Methacrylic acid (MAA) | (parts) | 8.5 |
|  | TMPT/MAA | (weight ratio) | 57.5/42.5 |
|  | Activated zinc oxide | (parts) | 55 |
|  | Dicumyl peroxide | (parts) | 3.2 |
| Properties | Weight | (g) | 44.5 |
|  | Initial velocity* | (m/sec) | 67.0 |
|  | Hardness |  | proper |

*Measuring condition is the same as that in Table 1.

EXAMPLE 13

A composition having a compounding recipe shown in the following Table 7 was cured in a mold at 150° C. for 30 minutes to obtain a solid core having a diameter of 37.4 mm, and the core was enclosed in a cover consisting of the same Surlyn 1707 as used in Example 4 to produce a two-piece solid golf ball.

Properties of the ball are shown in Table 7.

EXAMPLES 14-16

A composition having a compounding recipe shown in the following Table 8 was cured in a mold at 150° C. for 30 minutes to obtain a solid core having a diameter of 37.2 mm. The core was enclosed in a Surlyn cover shown in Table 8, and the resulting assembly was melted and molded in a mold for golf balls to obtain a two-piece solid golf ball having a diameter of 41.15 mm.

Properties of the balls are shown in Table 8.

Table 8

|  |  |  | Example | | |
|---|---|---|---|---|---|
|  |  |  | 14 | 15 | 16 |
| Compounding recipe for core | Cis-polybutadiene | (parts) | 100 | 100 | 100 |
|  | Trimethylolpropane trimethacrylate (TMPT) | (parts) | 11.5 | 11.5 | 11.5 |
|  | Methacrylic acid (MAA) | (parts) | 8.5 | 8.5 | 8.5 |
|  | TMPT/MAA | (weight ratio) | 57.5/42.5 | 57.5/42.5 | 57.5/42.5 |
|  | Activated zinc oxide | (parts) | 65 | 32.5 | — |
|  | Basic zinc carbonate* | (parts) | — | 32.5 | 65 |

Table 8-continued

|  |  |  | Example | | |
|---|---|---|---|---|---|
|  |  |  | 14 | 15 | 16 |
| Compounding recipe for cover | Dicumyl peroxide | (parts) | 3.2 | 3.2 | 3.2 |
|  | Surlyn 1707 | (parts) | 100 | 100 | 100 |
|  | Titanium dioxide | (parts) | 3 | 3 | 3 |
|  | Weight | (g) | 45.6 | 45.3 | 44.9 |
| Properties of ball | Initial velocity** | (m/sec) | 66.5 | 66.6 | 66.4 |
|  | Hardness |  | proper | proper | proper |

*Made by Seido Chemical Industry Co., containing a small amount of zinc hydroxide.
**Measured day: E, club head speed: 45.6±0.2 m/sec, temperature of ball: 15° C.

EXAMPLE 17 AND COMPARATIVE EXAMPLES 10 AND 11

A composition having a compounding recipe shown in the following Table 9 was press molded at 150° C. for 30 minutes in a mold to obtain a solid core having a diameter of 38.2 mm. The core was enclosed in a cover (thickness 2.3-2.5 mm) having a compounding recipe shown in Table 9, and the resulting assembly was melted and molded in a mold for golf balls to obtain a two-piece solid golf ball.

Properties of the golf ball are shown in Table 9.

Table 9

|  |  |  | Example | Comparative Example | |
|---|---|---|---|---|---|
|  |  |  | 17 | 10 | 11 |
| Compounding recipe for core | Cis-polybutadiene | (parts) | 100 | 100 | 100 |
|  | Trimethylolpropane trimethacrylate (TMPT) | (parts) | 11.5 | 20 | 0 |
|  | Methacrylic acid (MAA) | (parts) | 8.5 | — | 20 |
|  | TMPT/MAA | (weight ratio) | 57.5 | 100 | 0 |
|  |  |  | 42.5 | 0 | 100 |
|  | Activated zinc oxide | (parts) | 30 | 30 | 30 |
|  | Dicumyl peroxide | (parts) | 3.2 | 3.2 | 3.2 |
| Compounding recipe for cover | Surlyn 1707 | (parts) | 100 | 100 | 100 |
|  | Titanium dioxide | (parts) | 3 | 3 | 3 |
|  | Weight | (g) | 45.1 | 44.9 | 45.2 |
| Properties of ball | Initial velocity* | (m/sec) | 67.8 | 67.0 | 66.8 |
|  | Hardness |  | proper | too soft | too hard |

*Measured day: F, club head speed: 45.7±0.2 m/sec, temperature of ball: 15° C.

As seen from Table 5, even in the golf balls having a large diameter, the ball accordng to the present invention is high in initial velocity and has a high proper hardness.

Comparison in the durability test of the solid core of the two-piece solid golf ball in Example 17 with the solid core (referred to as Core A) of commercially available acrylic acid-type two-piece solid golf ball and the solid core (referred to as Core B) of commercially available ester-type two-piece solid golf ball showed that the durability of core A and that of core B were 10 and 45 respectively based on the durability (calculated as 100) of the solid core in Example 17.

What is claimed is:

1. A two-piece solid golf ball comprising a solid core and a cover enclosing the core, said core being obtained by curing a composition comprising
    (a) 100 parts by weight of polybutadiene containing at least 40% of cis-1,4 configuration,
    (b) 9-20 parts by weight of a polyfunctional unsaturated ester being selected from the reaction products of an acid selected from the group consisting of acrylic acid and methacrylic acid with an alcohol selected from the group consisting of di-hydric alcohols, tri-hydric alcohols and tetra-hydric alcohols
    (c) 5-10 parts by weight of an acid selected from the group consisting of methacrylic acid, acrylic acid and mixtures thereof, the total amount of the ingredients (b) and (c) being 15-30 parts by weight and the weight ratio of the ingredient (b) to the ingredient (c) being within the range of 55/45-80/20,
    (d) 20-80 parts by weight of a zinc compound which reacts with the ingredient (c) to form crosslinkage by metal ion bonding, wherein the amount of the zinc compound exceeding 10 parts by weight based on 100 parts by weight of the ingredient (a) acts as a filler to adjust the weight of the golf ball, and
    (e) 0.5-5 parts by weight of an alkyl peroxide, and said cover comprising
    (f) 100 parts by weight of a metal salt of a copolymer of ethylene and unsaturated carboxylic acid, said metal salt having a loss tangent of lower than 0.08, and
    (g) 1-5 parts by weight of an inorganic filler.

2. The golf ball according to claim 1, wherein said polybutadiene (a) contains at least 90% of cis-1,4 configuration.

3. The golf ball according to claim 1, wherein said polyfunctional unsaturated ester (b) is at least one ester selected from the group consisting of ethylene glycol dimethacrylate, trimethylolpropane trimethacrylate and tetramethylolmethane triacrylate.monomethacrylate.

4. The golf ball according to claim 1, wherein said acid (c) is methacrylic acid.

5. The golf ball according to claim 1, wherein said zinc compound (d) is at least one member selected from the group consisting of zinc oxide, zinc carbonate and zinc hydroxide.

6. The golf ball according to claim 5, wherein said zinc compound (d) is activated zinc oxide.

7. The golf ball according to claim 1, wherein said alkyl peroxide (e) is dicumyl peroxide.

8. The golf ball according to claim 1, wherein said inorganic filler (g) is at least one member selected from the group consisting of silica, zinc oxide and titanium dioxide.

9. The golf ball according to claim 1, wherein the amount of said polyfunctional unsaturated ester (b) is 11.5–17.5 parts by weight.

10. The golf ball according to claim 1, wherein the amount of said acid (c) is 6–8.5 parts by weight.

11. The golf ball according to claim 1, wherein the total amount of the ingredients (b) and (c) is 18–26 parts by weight.

12. The golf ball according to claim 1, wherein the weight ratio of the ingredient (b) to the ingredient (c) is 57/43–75/25.

13. A two-piece solid golf ball comprising a solid core and a cover enclosing the core, said core being obtained by curing a composition comprising (a) 100 parts by weight of polybutadiene containing at least 40% of cis-1,4 configuration, (b) 9–20 parts by weight of a polyfunctional unsaturated ester being selected from the reaction products of an acid selected from the group consisting of acrylic acid and methacrylic acid with an alcohol selected from the group consisting of dihydric alcohols, tri-hydric alcohols and tetra-hydric alcohols, (c) 5–10 parts by weight of an acid selected from the group consisting of methacrylic acid, acrylic acid and mixtures thereof, the total amount of the ingredients (b) and (c) being 15–30 parts by weight and the weight ratio of the ingredient (b) to the ingredient (c) being within the range of 55/45–80/20, (d) 20–80 parts by weight of a zinc compound which reacts with the ingredient (c) to form crosslinkage by metal ion bonding, wherein the amount of the zinc compound exceeding 10 parts by weight based on 100 parts by weight of the ingredient (a) acts as a filler to adjust the weight of the golf ball, (e) 0.5–5 parts by weight of an alkyl peroxide, and (f) 0.1–5 parts by weight of stearic acid, and said cover comprising (g) 100 parts by weight of a metal salt of a copolymer of ethylene and unsaturated carboxylic acid, said metal salt having a loss tangent of lower than 0.08, and (h) 1–5 parts by weight of an inorganic filler.

* * * * *